United States Patent Office 3,782,991
Patented Jan. 1, 1974

3,782,991
ALUMINUM SULFATE AND CALCIUM SULFATE ADDITIVES FOR IMPROVING THE QUALITY OF CEMENT, MORTAR AND CONCRETE AND METHOD FOR THE PRODUCTION OF SUCH IMPROVED PRODUCTS
Theodor Burge, Zurich, Switzerland, assignor to Sika AG, Zurich, Switzerland
No Drawing. Filed May 11, 1971, Ser. No. 142,349
Claims priority, application Austria, May 12, 1970, A 4,250/70
Int. Cl. C04b *13/22, 13/24, 31/02*
U.S. Cl. 106—315                                          17 Claims

ABSTRACT OF THE DISCLOSURE

An additive for improving the properties of building materials, such as cement, concrete and mortar, especially for increasing the early strength, the ability to carry out concreting at low temperatures and for volume control, without impairing the other qualitative properties of the building material, wherein the additive, apart from extenders and/or other additive substances consists of calcinated, anhydrous or water free aluminum sulfate. Techniques are also disclosed for producing the novel additive as well as for producing such building materials with improved properties.

BACKGROUND OF THE INVENTION

The present invention broadly deals with means and techniques for improving the qualitative features of cement, mortar and concrete. In its more specific aspects this invention concerns a novel additive which is added to cement, mortar and concrete or to the starting or principal products used to manufacture these building materials. Furthermore, this invention also concerns novel methods of producing such building materials, cement, mortar and concrete, with the air of such inventive additive in order to impart improved qualities thereto.

It is generally known to the art to add additives having a defined action or effect to cement, mortar and concrete, such as for instance strength-increasing, rapid-hardening accelerators. The heretofore employed techniques used individually or in mixture alkali hydroxide, alkali carbonate, alkali silicate, alkali aluminate, calcium chloride and aluminum chloride.

A proposal has already been advanced in the art to add as the setting accelerator for light weight concrete, that is concrete having a water-cement ratio (hereinafter referred to briefly as W/Z) greater than 2, a relatively high amount of aluminum sulfate containing water of crystallization, and specifically containing 5% to 15% by weight, based upon the cement. Thus there can be utilized not only the normal hydrate ($18H_2O$) but also the decahydrate ($10H_2O$) and hexahydrate ($6H_2O$) obtained during drying above 120° C.

However with the heretofore known means the special effects could only be obtained by giving up other desirable properties. For instance, during accelerated setting according to the known methods the strength properties could be impaired and shrinkage as well as corrosion dangers increased. These drawbacks are no longer acceptable because of the increasing demands placed upon such building materials, both with regard to rational and rapid processing thereof as well as with respect to their qualitative properties.

SUMMARY OF THE INVENTION

Therefore, the building trade is still in need of building materials, such as cement, mortar and concrete, possessing an improved combination of properties over those present at this time. It is therefore a primary object of the present invention to fulfill this need.

Another and more specific object of the instant invention relates to a novel additive for cement, mortar and concrete, especially heavy concrete mixtures, for the purpose of achieving combined effects in these building materials which were not previously attainable.

Still a further significant object of the present invention is the provision of a novel additive for building materials resulting, in particular, the provision of high advanced or early strength properties therein.

Furthermore, an additional object of the present invention relates to improved building materials wherein through the use of the invention additive the concrete work can be performed at lower temperatures.

A further object of this invention relates to novel additives for building materials, such as cement, mortar and concrete, and wherein the use of the novel additive permits manufacture of shrinkage-free cement or also expansion cement.

Another and equally further significant object of the present invention aims at providing the aforementioned effects in building materials either individually or in combination, and without impairing the other qualitative properties of the mentioned building materials.

A further objective of this invention relates to a novel method for fabricating cement, mortar and concrete with improved qualitative properties through the use of the inventive additive.

The invention further has for one of its additional objects preferred method techniques for fabricating the inventive additive.

Now, in order to implement these and still further objects of the invention, it will be recognized that the invention contemplates obtaining the objectives thereof by providing an additive which contains as the active component water free or anhydrous, calcinated aluminum sulfate in addition to other active components and/or fillers.

Aluminum sulfate, $Al_2(SO_4)_3$, is a known material which forms a considerably large number of hydrates, that is, compounds with bound water of crystallization. Octadecahydrate is commercially available on the market. Other known hydrates which are formed upon heating to temperatures above 120° C. are decahydrate ($10H_2O$), nonahydrate ($9H_2O$), hexahydrate ($6H_2O$) and so forth (cf. H. Römpp, Chemie-Lexikon, 6th ed., vol. 1, columns 247/248; Kirk-Othmer, Encyclopedia of Chemical Technology, 1947, volume 1, page 654).

The anhydrous or water free compound is first obtained above 340° C. to 350° C. by burning (calcination). Surprisingly, the particular properties of this calcinated aluminum sulphide enable, in completely unexpected manner, obtaining the aforementioned effects. For instance, the calcinated, anhydrous aluminum sulfate exhibits a very large heat of solution, namely about 125 kcal./mol. It is assumed that by virtue of this high heat of solution the hydration of the cement proceeds quicker than previously. This is so because during this cement hydration, heat is again released and the early or incipient hardening proceeds quicker, resulting on the one hand in the determined increased early strength properties of the building material. This phenomena serves as the basis for an improved use of the building materials for the concrete work at lower temperatures. The obtained incipient or early strength properties are above those obtained when using in known manner calcium chloride as the additive. In the tests mentioned hereinafter the incipient strength properties were measured throughout the interval in which hydration proceeds. Used as the determination method was the thermometric rapid method of M. T. Francardi, l'Industria del Cemento 33 (1963), 95–98.

The anhydrous, calcinated aluminum sulfate employed according to the inventive teachings acts at least as a thermal starter of a reaction, namely the cement hydration, and differs from all other strength accelerators including aluminum sulfate containing water of crystallization.

In contrast to aluminum sulfates containing water of crystallization, the inventively employed calcinated, that is, completely water free salt, notwithstanding its higher heat of solubility, exhibits a much lower velocity of dissolution. When adding the known water-containing aluminum sulfate to cement mixtures in quantities beginning at about 0.5%, based upon the weight of the cement, an acceleration of the setting process was observed, however no accelerated development of the strength properties. A completely different behavior is present when utilizing the inventive water free or anhydrous aluminum sulfate which in doses beneath 5% practically does not influence the setting times, yet leads to a more marked increase in the early or incipient strength properties of the building material. When using increased doses there is likewise present a rapid-binder effect.

The duration for the dissolution of 30 grams of $Al_2(SO_4)_3 \cdot 18H_2O$ in 100 grams of water amounted to about 60 seconds. Under the same conditions 30 grams of $Al_2(SO_4)_3 \cdot OH_2O$ first dissolve in 8 hours. This slow dissolution of the water of crystallization can be used to compensate the shrinkage or contraction of the cement or even to obtain an expansion effect.

It is possible to use fillers as further components of the inventive additive. These fillers serve for improving the dosing of the aluminium sulfate contained in the additive and the possibly present further auxiliary components. As will be more fully discussed hereinafter the aluminum sulfate is preferably used in only relatively small quantities which can vary between approximately 0.2% to 10%, in particular between 0.2% to 2%, based upon the weight of the cement.

Suitable as the fillers, that is to say the extenders, for the invention are inert or reactive materials. Examples of such inert materials, that is fillers which remain unchanged during manufacture, storage and use of the additives, are for instance mineral fillers such as calcium carbonate, fine sand, thalcum, glimmer, and so forth. Examples of reactive fillers are for instance cement, calcium sulfate (the workings of which will be explained hereinafter), hygroscopic agents which prevent a premature hydration of the aluminum sulfate, for instance ground, water free silica gel, bentonite, molecular sieves, diatomaceous earth, and so forth. Generally the inventive additive contains 10 to 20% by weight of water free aluminum sulfate, the remainder being extenders and/or other active components. Reference will be made in this connection to Table 1 given hereinafter.

Active components which may be present if desired and which intensify the aforementioned combined effects or bring about further such effects, are for instance the following:

(1) Retardation agents

These serve to control an expansion effect of the inventively employed water free or anhydrous aluminum sulfate. Examples of such retardation or deceleration agents are salts of gluconic acids, such as sodium gluconate, potassium gluconate, iron gluconate, calcium gluconate, magnesium gluconate, aluminum gluconate, and so forth. It is preferred to use sodium gluconate. Further examples are the salts of pyrophosphoric acids such as sodium pyrophosphate, potassium pyrophosphate, ammonium pyrophosphate, calcium pyrophosphate, magnesium pyrophosphate, aluminum pyrophosphate and corresponding acidic pyrophosphates, but it is preferred however to use sodium pyrophosphate; and also calcium sulfate. The latter is particularly preferred because during setting of the cement it forms with the calcinated aluminum sulfate and the free calcium hydroxide, released from the calcium silicate of the cement, the needle-shaped ettringite ($3CaO \cdot Al_2O_3 \cdot CaSO_4 \cdot 32H_2O$) which act in a high-strength producing manner. Instead of using calcium sulfate it is also possible to use other sulfates, such as potassium sulfate, sodium sulfate, magnesium sulfate, and so forth.

(2) Setting accelerators

In this connection there are particularly to be mentioned the following: alkanolamines, such as monoethanolamine, diethanolamine, and triethanolamine as well as their technological or industrial mixtures; alkali silicates, especially sodium silicate; and alkaline or alkali reacting compounds such as hydroxides (KOH, NaOH, $Co(OH)_2$), carbonates ($Na_2CO_3$, $K_2CO_3$) and sodium aluminate. It is preferred to use as the setting accelerator a synergistic combination of triethanolamine, simultaneously acting as a corrosion protective agent, and sodium silicate.

The following Table 1 provides a very good overall picture regarding several compositions of the inventive additives.

TABLE 1
Composition of Additives, Percent by Weight

| Group No. | $Al_2(SO_4)_3$ calcinated | Retardation agent (calcium sulfate) | Setting accelerator | | Extender | Effect |
|---|---|---|---|---|---|---|
| | | | Triethanolamine | Sodium silicate | | |
| I | 10 to 90 | | | | Cement, 90 to 10 | Increase of early strength plus capable of carrying out low temperature concreting work. |
| II | 10 to 60 | | 2 to 10 | 10 to 50 | Cement, 0 to 50 | I plus setting acceleration. |
| III | 90 to 30 | 10 to 70 | | | | I plus shrinkage compensation or expansion. |

The manufacture of the inventive additive is undertaken in such a manner that commercially available aluminum sulfate containing water of crystallization is calcinated by heating such to temperatures exceeding 340° C., preferably from about 400° C. to 480° C., thereby obtaining the water free product. Inert extenders or cement can also be present during calcination. After cooling in a dry atmosphere there can be added, if desired or necessary, the remaining components in suitable mixers. In order to retard or prevent a premature take-up of water by the obtained calcinated aluminum sulfat eit is possible, as explained above, to use hygroscopic or moisture-attracting extenders, or the calcinated product is ground together with hydrophobic or moisture-repellent agents such as stearates, in particular calcium stearate, magnesium stearate, zinc stearate or aluminum stearate.

The additives are intended as additives for cement, mortar and concrete. Under the term "cement" as used herein there is to be understood the known hydraulic binding agents such as portland cement, white cement, blast-furnace cement, trass cement, slag cement, fly ash cement, and so forth. The term "mortar" as used herein relates to mixtures of cement, additives, that is, sand, with a grain size up to 6 millimeters, and water. Finally, the term "concrete" as used herein is intended to denote a mixture composed of cement, sand and gravel with a standard granulation or grain size of 30 millimeters, but which in special cases can amount to as much as up to 120 millimeters, and water. The preferred type of concrete used within the framework of the invention is dense concrete, that is concrete with a $W/Z$ of 0.4 to 0.7, especially about 0.5.

The quantity of additive applied to the cement fluctuates in accordance with the effect which is desired to be obtained and the concentration of aluminum sulfate. However, it corresponds generally to about 0.2 to 10%, especially 0.2 to 2%, of the weight of the cement and based upon the aluminum sulfate.

The following examples will serve to further explain the techniques employed during the fabrication of the additives and the use thereof. In the examples given hereinafter the quantitative amounts given (parts, percent) are always based upon weight.

EXAMPLE 1

1000 parts commercially available aluminum sulfate $[Al_2(SO_4)_3 \cdot 12H_2O]$ are heated in an electric furnace equipped with a flue upon sheet metal shelves during the course of 2 hours to a temperature of 450° C. to 490° C. This temperature is maintained for 24 hours. Such is then cooled while excluding air and after adding 5 parts calcium stearate ground in a ball mill to cement fineness. This product can be maintained for unlimited time in closed vats or containers.

100 parts diatomaceous earth are homogeneously admixed with 5 parts triethanolamine in a ball mill. 35 parts sodium silicate are added to this pre-mixture and such is again homogenized. There is then obtained 140 parts mixture. To this there is added 60 parts of the calcinated aluminum sulfate as obtained above.

EXAMPLE 2

Calcinated aluminum sulfate is produced according to the procedures of Example 1. 100 parts of the water free product are ground in a ball mill with 100 parts broken gypsum.

A different additive is obtained if there is ground 200 parts gypsum.

EXAMPLE 3

Initially calcinated aluminum sulfate is fabricated according to the mode of operation described above in connection with Example 1.

100 parts of the obtained water free product are ground in a ball mill with 100 parts broken limestone until reaching cement fineness.

EXAMPLE 4

10 grams of water and 20 grams cement (or cement plus additive) are stirred for 3 minutes and thereafter permitted to stand during the desired hydration time. After expiration of the desired time the hydration is interrupted by the addition of ethanol (20 ml.). The water-alcohol mixture is separated from the cement by centrifuging. There is removed 20 ml. from the mixtures; after the addition of 10 ml. benzol the liquid is heated (60° C. to 70° C.), until the initial turbidity has disappeared. During cooling the temperature is measured at which the turbidity again appears.

By means of a calibrating plot it is possible to determine the quantity of water corresponding to the relevant temperature, that is, there can be determined the difference between the original amount of water (10 ml.) and the quantity of water remaining after completion of hydration.

The described trial was carried out with two samples. The first sample consisted of pure cement, the second of 20 grams cement plus 0.4 grams of an additive consisting of 35 parts sodium silicate, 10 parts triethanolamine and 55 parts calcinated aluminium sulfate.

Hydration was monitored at 0° C. to 5° C. according to the above described techniques. The results have been tabulated in Table II from which there can be recognized the much more rapid hydration, that is, the development of the earlier strength.

TABLE II

| Hydration after— | Gms. bound water per 20 gms, cement | |
|---|---|---|
| | Without additive | With additive |
| Hours: | | |
| 0.5 | 0.15 | 0.34 |
| 1 | 0 17 | 0.42 |
| 2 | 0.21 | 0.55 |
| 3 | 0.23 | 0.63 |
| 4 | 0.26 | 0.76 |
| 5 | 0.29 | 0.825 |
| 6 | 0.325 | 0.89 |
| 7 | 0.36 | 0.93 |

EXAMPLE 5

This example illustrates the development of the incipient or early strength properties by virtue of the inventive additive, and specifically while using different cements.

There is produced a heavy or dense concrete from 230 parts sand, with a grain size of 0 to 8 millimeters, 252 parts gravel, with a grain size of 8 to 30 millimeters, 75 parts cement and 37.5 parts water. The water-cement ratio $(W/Z)$ therefore amounted to 0.5. The additive consisted of 35% sodium silicate, 5% triethanolamine and 60% calcinated aluminium sulfate. The results have been set forth together with those of the control trials in Table III.

TABLE III
Concrete-compressive strengths in kg./cm.$^2$

| After— | Normal portland cement (Z 375) [1],[a] | High-grade portland cement (Z 550) [2],[a] | Normal portland cement plus 2% $CaCl_2$ | Normal portland cement plus 2% of the inventive additive, based upon cement and $Al_2(S_iO_3)$ |
|---|---|---|---|---|
| Hours: | | | | |
| 6 | | 8 | 19 | 10 |
| 9 | 14 | 31 | 38 | 53 |
| 12 | 29 | 80 | 69 | 86 |
| 15 | 60 | 132 | 81 | 117 |
| 18 | 85 | 180 | 102 | 144 |
| 21 | 112 | 193 | 114 | 163 |
| 24 | 146 | 212 | 142 | 173 |
| 48 | 218 | 290 | 222 | 225 |

[1] ASTM: Type I.
[2] ASTM: Type III.
[a] Norms according to "Cement Standards", Cembureau, Paris 1968.

The rapid development of the early strength, that is to say, 9 to 15 hours after preparation can be clearly recognized from this table, likewise the fact that the additives do not cause any loss in strength.

EXAMPLE 6

There is produced a mortar from 1000 parts portland cenment, 300 parts sand (grain size 0 to 6 millimeters), and 500 parts water ($W/Z=0.5$). A third of the mortar does not have any additive added thereto, to the second third there is added a mixture of 1 part calcinated aluminium sulfate and 2 parts gypsum (additive A), and specifically 3 parts of the additive to 100 parts cement. To the last third there is added 2 parts, based upon 100 parts cement, of a mixture of the same proportions of calcinated aluminium sulfate and gypsum. The development of the volumes of the three mixtures has been illustrated in Table IV:

TABLE IV

| Days | Linear expansion or contraction in percent | | |
|---|---|---|---|
| | Without additive | Additive A | Additive B |
| ⅓ | 0 | +4.5 | +0.2 |
| ⅔ | 0 | +5 | +0.5 |
| 1 | −0.02 | +5 | +0.8 |
| 2 | −0.05 | +5 | +1.5 |
| 3 | −0.08 | +5 | +2.5 |
| 4 | −0.13 | +5 | +3.5 |
| 5 | −0.20 | +5 | +4 |

While there is shown and described present preferred embodiments of the invention, it is to be distinctly understood that the invention is not limited thereto but may be otherwise variously embodied and practiced within the scope of the following claims.

What is claimed is:

1. An additive for improving the properties of building materials seelcted from the group consisting of cement, concrete and mortar, particularly for increasing early strength, for carrying out concreting work at low temperatures and for volume control, without impairing other qualitative properties of the building materials, said additive consists of 90 to 30% by weight of calcinated, anhydrous aluminium sulfate, the balance being calcium sulfate as a setting retardation agent.

2. An additive for improving the properties of building materials selected from the group consisting of cement, concrete, and mortar, particularly for increasing early strength, for carrying out concreting work at low temperatures and for volume control, without impairing other qualitative properties of the building materials, said additive consisting essentially of 10–90% by weight of calcined, anhydrous aluminum sulfate, the balance being a filler substance which contains an alkanolamine and an alkaline-reacting inorganic compound.

3. The additive as defined in claim 2, wherein said inorganic compound is sodium silicate.

4. The additive as defined in claim 2, wherein said alkanolamine is triethanolamine.

5. The additive as defined in claim 2, wherein the inorganic compound is sodium silicate, and such additive consists of aluminum sulfate, triethanolamine and sodium silicate in a weight ratio of (10–60):(2–10):10–50).

6. An additive for improving the properties of building materials selected from the group consisting of cement, concrete, and mortar, particularly for increasing early strength, for carrying out concreting work at low temperatures and for volume control, without impairing other qualitative properties of the building materials, said additive consisting essentially of 10–90% by weight of calcined, anhydrous aluminum sulfate, the balance being a filler substance which comprises a hydrophobic substance which prevents premature hydration of the aluminum sulfate.

7. A method for manufacturing an additive for improving the properties of building materials selected from the group consisting of cement, concrete and mortar, comprising the steps of calcinating a composition consisting essentially of aluminium sulfate containing water of crystallization with cement or cement clinker by heating such to a temperature exceeding 350° C., then cooling the obtained product, and thereafter adding the product to the building material.

8. A method for manufacturing an additive for improving the properties of building materials selected from the group consisting of cement, concrete and mortar, comprising the steps of adding to the building material a sufessentially of aluminum sulfate containing water of crystallization by heating such to a temperature exceeding 350° C., cooling the obtained product, then grinding the cooled product together with a hydrophobic agent in order to prevent or reduce premature water absorption, and thereafter adding the product to the building material.

9. The method as defined in claim 8, wherein said hydrophobic agent is a metallic stearate.

10. A method of manufacturing building materials selected from the group consisting of cement, mortar, and concrete, to possess increased early strength, good ability to carry out concreting work at low temperatures and/or controlled development of the volume, without impairing other qualitative properties of the building material, comprising the steps of adding to the building maerial a sufficient amount of additive of claim 1 to provide 0.2 to 10% by weight of calcinated aluminium sulfate free of water of crystallization.

11. The method as defined in claim 10, further including the step of adding to the building material a silicate as a setting accelerator.

12. The method as defined in claim 10, further including the step of adding to the building material an alkanolamine as a non-corroding setting accelerator.

13. The method as defined in claim 12, wherein the alkanolamine is triethanolamine.

14. The method as defined in claim 10, further including the step of adding calcium sulfate as a setting retarding agent to the building material.

15. The method as defined in claim 10, further including the step of adding to the building material a hydrophobic substance which prevents premature hydration of the aluminium sulfate.

16. The method as defined in claim 10, further including the step of adding sodium silicate to the building material.

17. The method as defined in claim 10, wherein the anhydrous, calcinated aluminium sulfate is added to said building material in the form of a cement-aluminium sulfate mixture.

References Cited

UNITED STATES PATENTS

| | | | |
|---|---|---|---|
| 1,951,691 | 3/1934 | Coxon | 106—109 |
| 3,366,502 | 1/1968 | Lombardo | 106—314 |
| 3,114,647 | 12/1963 | Mecham | 106—314 |
| 2,820,714 | 1/1958 | Schneiter et al. | 106—315 |
| 2,390,138 | 12/1945 | Vallandigham | 106—315 |
| 2,216,555 | 10/1940 | King et al. | 106—315 |
| 1,901,890 | 3/1933 | Barnhart et al. | 106—314 |

FOREIGN PATENTS

| | | | |
|---|---|---|---|
| 493,372 | 10/1938 | Great Britain | 106—109 |

OTHER REFERENCES

Taylor, W. H., "Concrete Technology and Practice," American Elsevier Publishing Co., 1965, p. 473.

Welch, F. C., "Effects of Accelerators and Retarders on Calcined Gypsum," Journal of the American Ceramic Society, vol. 6, No. 11, November 1923.

Hackh's Chemical Dictionary, "$CaSO_4 \cdot 2H_2O$, p. 125, 4th edition, McGraw-Hill Book Company, 1969.

ALLEN B. CURTIS, Primary Examiner

M. L. BELL, Assistant Examiner

U.S. Cl. X.R.

106—89